United States Patent Office 3,827,862
Patented Aug. 6, 1974

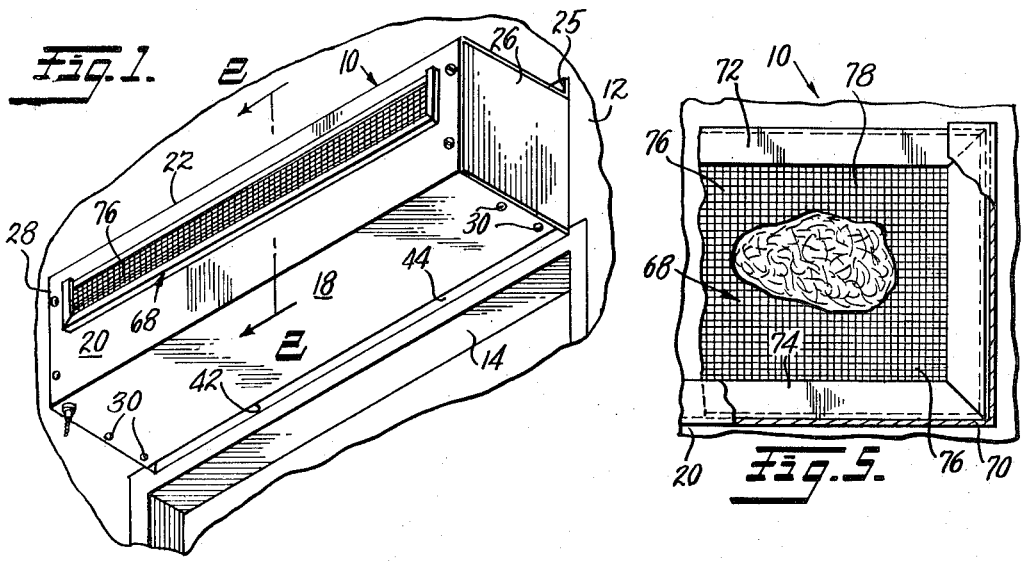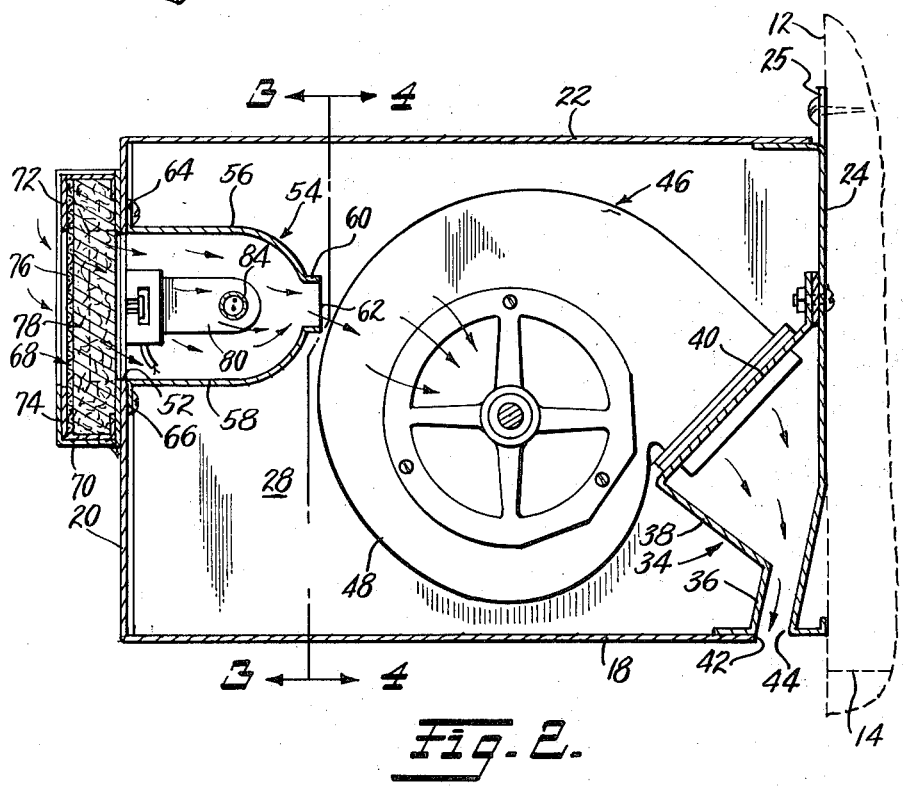

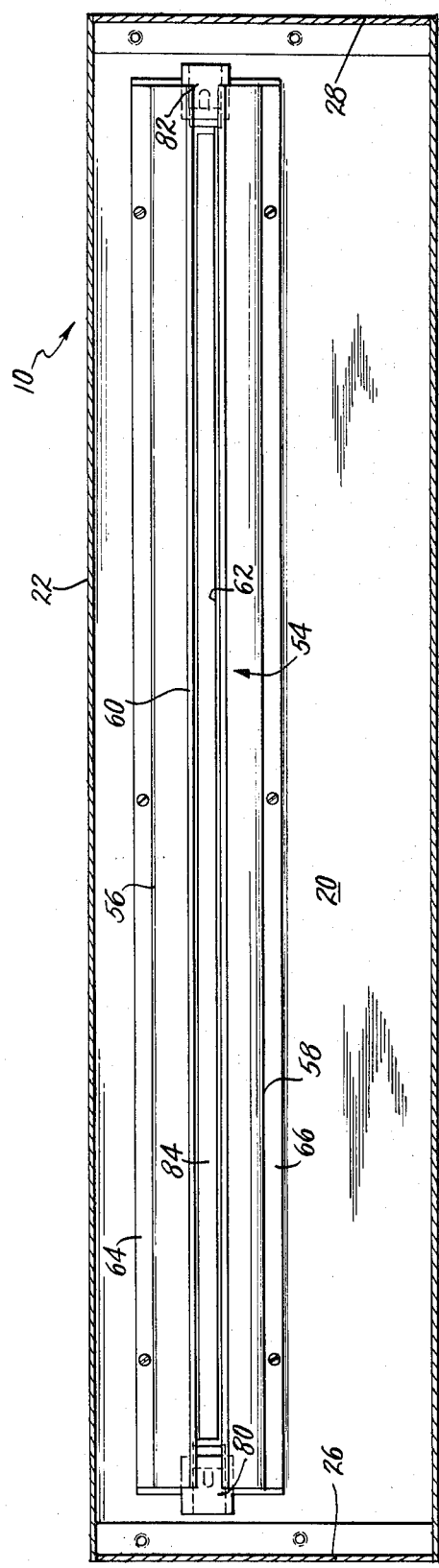
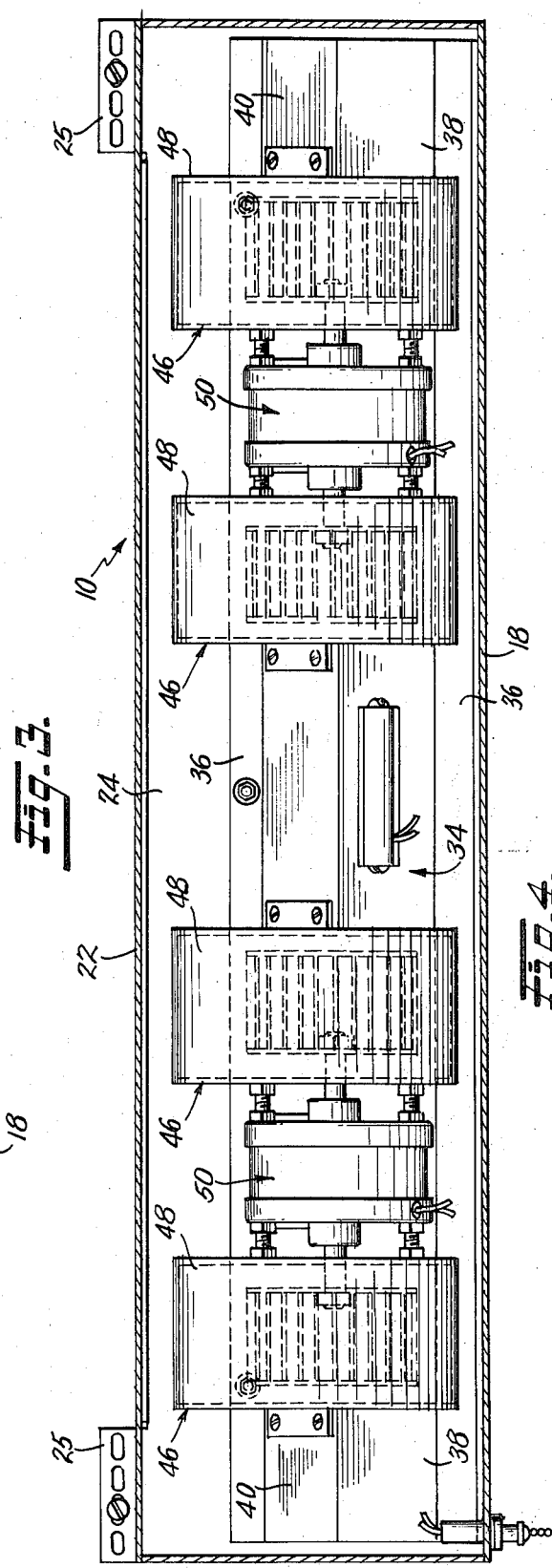

3,827,862
AIR CURTAIN DEVICE INCORPORATING
ULTRAVIOLET LIGHT
Sigmund F. Berlant, 6023 Ward Lane, P.O. Box 762,
Levittown, Pa. 19058
Filed Aug. 10, 1972, Ser. No. 279,330
Int. Cl. A61l 9/00; F24f 9/00
U.S. Cl. 21—74 R        1 Claim

ABSTRACT OF THE DISCLOSURE

An air curtain device has plural blower assemblies within a housing discharging air into a plenum chamber and thereafter outwardly in a laterally elongated continuous stream. The housing has an air intake upstream of the blowers with an internal air inlet guide having an ultraviolet light source therein to treat and decontaminate air as drawn into the device.

BACKGROUND OF THE INVENTION

(1) Field of the Invention

This invention pertains to air curtains employed at entrances to rooms or buildings, and the like. The air curtain is treated by the imposition of an ultraviolet source on the air supply prior to expulsion.

(2) Statement of the Prior Art

It has heretofore been known to provide air curtain devices of various types, illustratively as shown in Pat. No. 3,327,935. Moreover, other air treatment devices have employed ultraviolet light sources as a treatment media. Patents in that area include the following:

| Patent No. | Patentee | Issue date |
|---|---|---|
| 2,183,498 | Anderson | Dec. 12, 1939. |
| 2,335,056 | Grison | Nov. 23, 1943. |
| 2,449,681 | Wilson | Sept. 21, 1948. |
| 2,941,265 | Isenberg et al. | June 21, 1960. |
| 3,071,828 | Cornell | Jan. 8, 1963. |
| 3,247,374 | Wintermute | Apr. 19, 1966. |
| 3,313,971 | Nagy | Apr. 11, 1967. |

SUMMARY OF THE INVENTION

The present invention is directed to the provision of an air curtain having a sanitized air output particularly desirable for use in areas where avoidance of contamination via airborne bacterial spread is desirable. Health care facilities, food handling establishments, packaging plants and the like are but a selected few of the potential environments of employment of this invention. This function is principally accomplished through the incorporation of an ultraviolet light source in association with the air intake means for the curtain device, whereby air taken into the device is rendered free of those organisms subject to destruction by ultraviolet rays.

The apparatus hereof is further provided with screen and filter means to additionally destroy or inhibit the growth of bacteria at the inlet to the curtain.

Another objective of the invention resides in the location of the air intake means at a forward location, whereby the device may be positioned over doorways in low ceiling conditions.

It is an additional object of the invention to provide a device effective in the removal of odors from ambient air.

Other and further objects and advantages of the invention will become apparent to those skilled in the art from a consideration of the following specification when read in conjunction with the annexed drawings.

BRIEF DESCRIPTION OF THE DRAWINGS

FIG. 1 is a perspective view of a device according to this invention as employed over a door opening or the like;

FIG. 2 is an enlarged transverse vertical sectional view taken substantially on the line 2—2 of FIG. 1, looking in the direction of the arrows;

FIG. 3 is a sectional view taken substantially on line 3—3 of FIG. 2, looking in the direction of the arrows;

FIG. 4 is an enlarged sectional view on line 4—4 of FIG. 2; and

FIG. 5 is a fragmentary, enlarged plan view, showing details of a portion of the assembly.

DESCRIPTION OF THE PREFERRED EMBODIMENT

Referring to the drawings in more detail, an air curtain device according to the present invention is therein generally identified by reference numeral 10. The device is mounted on a wall 12 over a door frame 14 so as to expel a continuous curtain of air over the door opening. This installation is typical of the intended uses of the device, but the device may be employed wherever a sanitary air curtain would be useful.

The device includes a housing 16 formed of sheet metal or the like, having a botom wall 18, a back wall 20, top wall 22, and forward wall 24 with mounting brackets 25. The housing enclosure is completed by side walls 26 and 28. The walls may be joined together by any suitable means, such as by rivets 30, and may be of multilayer formation if desired. The back wall is provided with an elongate opening, described below.

Disposed within the housing is an elongated blower mounting plate 34 which extends across the distance between the side walls 26 and 28. The mounting wall has a vertical portion 36 and a first angular section 38. A slant wall 40 extends from the first angular section to the forward wall 24 of the housing, and has a series of orifices therein.

It will be observed in the drawing that the bottom wall 18 has a terminal edge 42 which is spaced from the forward wall 24, thereby providing an elongated opening 44. Over this opening within the housing is the slant wall 40, which with the mounting plate 34 and adjacent section of the forward wall, provides a plenum chamber, to receive air from a blower means described below.

A series of blower units 46, here each comprising a pair of blower housings 48 with an interposed drive motor 50 are secured to the slant wall 40. The blowers discharge air through the orifices in the wall 40 and into the aforesaid plenum chamber. The blower details are not specifically shown, but would preferably be of the same type shown in my previously mentioned prior Pat. No. 3,327,935.

The top wall 22 of the housing is imperforate. The back wall 20 has an elongated air entry slot 52 formed therein. Extending into the housing through the slot 52 is an air inlet guide 54. The guide 54 comprises an elongated body portion of substantially U-shaped cross section having opposing side walls 56, 58, and an inward spout 60 with an opening 62. The side walls each have a lateral flange 64, 66, respectively, and the guide fits within the opening 52 with the flanges disposed against the surrounding edges of the back wall. A screen assembly 68 which includes a frame 70 overlies the inlet guide and has rims 72, 74. The screen includes a large mesh outer screen element 76, and an inner filter element 78. The filter may be coated or otherwise treated with germicidal or bacteriostatic substances if desired. This protects the interior of the device from contamination when the ultraviolet light source mentioned below, is not in use.

The screen frame is held removably in place by means described below.

Secured within the opposite ends of the air inlet guide are lamp holders 80, 82, and an elongated tubular ultraviolet light bulb 84 extends therebetween. The inside surfaces of the walls 56 and 58 of the guide are preferably coated with a reflective substance, such as aluminum paint of the type sold under the trademark Alzak, which serves to reflect ultraviolet rays and to intensify and control radiation.

The screen is retained in place by suitable removable connectors, and conventional electrical supply means is also provided. The precise connection electrically is not shown and it will be understood that an appropriate switch means may be employed if desirable in a particular instance.

As appears from the foregoing description of structure, air for the blowers is introduced into the housing through the air inlet guide, whereat it is subjected to exposure to the ultraviolet source and also passes through the sanitizing filter. Thus, the air expelled from the plenum chamber has been so treated and is substantially free of those organisms subject to destruction by an ultraviolet source.

I claim:

1. An air curtain device for providing a sanitized air curtain, the device comprising:
    a housing having forward, back, side, and bottom walls, and having a top wall;
    an elongated blower mounting plate secured within the housing and extending between the side walls, the bottom wall having a longitudinally extending opening therein bordered by the back wall and the blower mounting plate;
    a slant wall, having plural orifices therein, extending from the blower mounting plate to the back wall over said longitudinally extending opening, the slant wall, blower mounting plate and adjacent portion of the back wall forming a plenum chamber;
    a series of blower units, each including a blower casing with an air outlet, on said slant wall, the outlets being aligned with the wall orifices;
    motor means on said slant wall for driving the blower units;
    the back wall having an elongated air entry slot formed therein;
    a screen on the back wall overlying the entry slot;
    an air inlet guide, comprising an elongated body portion of substantially U-form section having opposing side walls and a bight portion with an inwardly disposed spout, said guide being secured to the back wall so as to overlie said air entry slot with said spout spaced inwardly thereof and centered therewith; and
    an ultraviolet light source positioned in said guide and constituting an elongated bulb extending substantially the full width of the air inlet guide and centrally disposed therein such that the opposing side walls at said bight portion are curved about said elongated tubular ultraviolet light bulb to effect exposure of the air flow therethrough to the ultraviolet radiation prior to discharge through said spout under propulsion by said blower units into the plenum chamber and outwardly in an air curtain through the longitudinally extending opening of the bottom wall.

References Cited
UNITED STATES PATENTS

| | | | |
|---|---|---|---|
| 3,017,239 | 1/1962 | Rodman | 21—53 X |
| 3,094,400 | 6/1963 | Blanton | 55—279 X |
| 3,176,447 | 4/1965 | Omohundro et al. | 21 Dig. 2 |
| 3,327,935 | 6/1967 | Berlant | 98—36 |
| 3,674,421 | 7/1972 | Decupper | 21 Dig. 2 |

JOSEPH SCOVRONEK, Primary Examiner

T. W. HAGAN, Assistant Examiner

U.S. Cl. X.R.

21—Dig. 2; 55—279; 98—36